United States Patent
Zhao et al.

(10) Patent No.: US 12,042,925 B2
(45) Date of Patent: Jul. 23, 2024

(54) OVERSPRAY-FREE PAINT SYSTEM INCLUDING AGV/AMR-BASED FIXTURE LIFTING, POSITIOINING AND ORIENTING

(71) Applicant: GM GLOBAL TECHNOLOGY OPERATIONS LLC, Detroit, MI (US)

(72) Inventors: Xiang Zhao, Novi, MI (US); Hua-Tzu Fan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/963,306

(22) Filed: Oct. 11, 2022

(65) Prior Publication Data

US 2024/0116190 A1     Apr. 11, 2024

(51) Int. Cl.
| | |
|---|---|
| *B25J 11/00* | (2006.01) |
| *B05B 13/02* | (2006.01) |
| *B05B 13/04* | (2006.01) |
| *B66F 7/22* | (2006.01) |

(52) U.S. Cl.
CPC ....... *B25J 11/0075* (2013.01); *B05B 13/0221* (2013.01); *B05B 13/0228* (2013.01); *B05B 13/0235* (2013.01); *B05B 13/0285* (2013.01); *B66F 7/22* (2013.01); *B05B 13/0271* (2013.01); *B05B 13/0452* (2013.01)

(58) Field of Classification Search
None
See application file for complete search history.

(56) References Cited

U.S. PATENT DOCUMENTS

| | | | | |
|---|---|---|---|---|
| 1,866,100 | A * | 7/1932 | Clarence | B05B 13/0228 118/316 |
| 5,174,711 | A * | 12/1992 | Binder | B62D 65/02 254/8 R |
| 5,686,148 | A * | 11/1997 | Suzuki | B62D 65/18 198/375 |
| 2010/0129187 | A1 * | 5/2010 | Nishihara | B62D 65/18 414/609 |
| 2011/0101586 | A1 * | 5/2011 | Lands | B25H 1/0007 269/57 |
| 2012/0181735 | A1 * | 7/2012 | Ooe | B66F 7/08 269/58 |
| 2014/0227065 | A1 * | 8/2014 | Muller | B25J 9/1065 414/222.13 |
| 2015/0332213 | A1 * | 11/2015 | Galluzzo | B25J 9/162 700/218 |
| 2017/0283171 | A1 * | 10/2017 | High | B66F 9/063 |
| 2018/0065806 | A1 * | 3/2018 | Sugahara | B25J 9/04 |
| 2020/0114384 | A1 * | 4/2020 | Schwab | B05B 16/20 |
| 2020/0223631 | A1 * | 7/2020 | Azumi | B66F 9/063 |
| 2020/0339397 | A1 * | 10/2020 | Horimizu | B66F 7/0666 |
| 2021/0346905 | A1 * | 11/2021 | Schulze | B05B 12/32 |

\* cited by examiner

*Primary Examiner* — Binu Thomas

(57) ABSTRACT

A robotic lifting and orienting system for an overspray-free paint system includes: a base coupled to wheels; and an automated carrier coupled to the base. The automated carrier includes: a fixture assembly configured to hold an object to be painted; one or more manipulators configured to move the fixture assembly relative to a paint robot; a propulsion system connected to the wheels and configured to move the robotic lifting and orienting system; and a control module configured to control the one or more manipulators and the propulsion system to control positioning and orienting of the object relative to at least one of the paint robot and an overspray-free paint applicator of the paint robot.

18 Claims, 9 Drawing Sheets

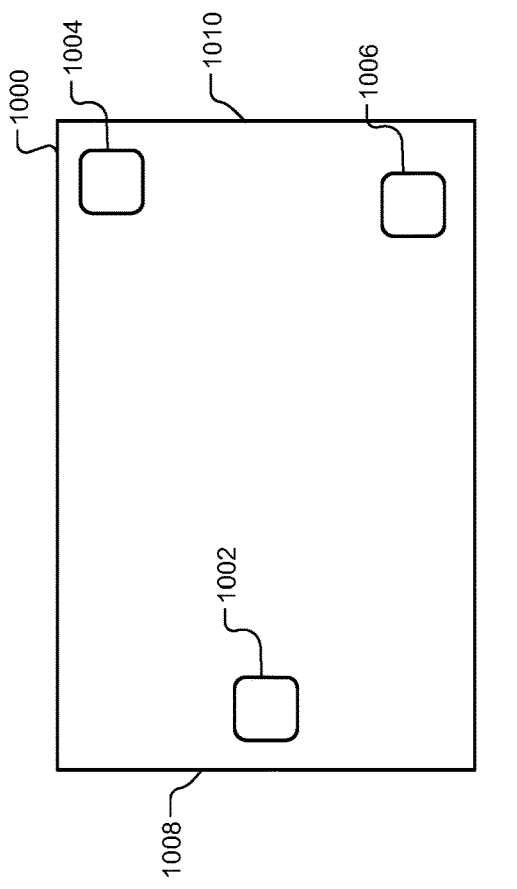
FIG. 9
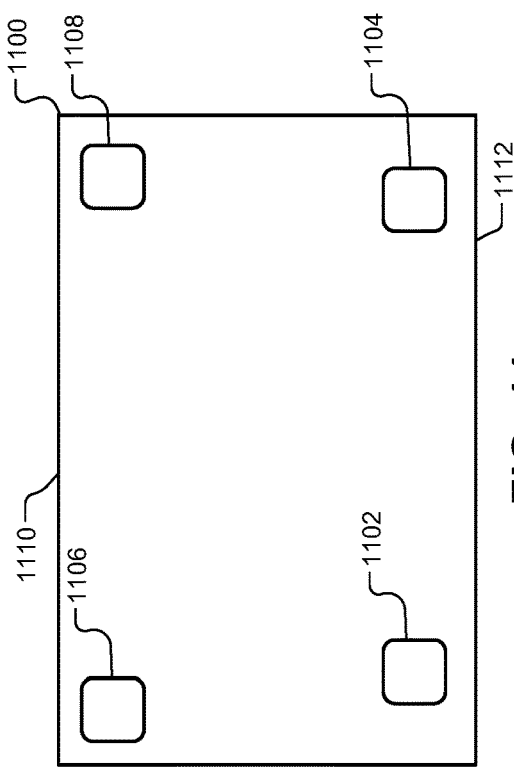
FIG. 10
FIG. 11

OVERSPRAY-FREE PAINT SYSTEM INCLUDING AGV/AMR-BASED FIXTURE LIFTING, POSITIOINING AND ORIENTING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle paint systems.

A vehicle body-in-white (BIW) paint system can include multiple paint booths. Each of the paint booths include multiple paint robots. A conveyor is used to move a BIW into and out of the paint booths. The BIW is mounted on a fixture that is held by the conveyor and moved along a conveyor line through each of the paint booths. The paint robots spray the BIW and overspray is drawn into a sludge tank located below the conveyor line in each of the paint booths. While in each of the paint booths, different areas of the BIW are painted respectively by the paint robots in that paint booth.

SUMMARY

A robotic lifting and orienting system for an overspray-free paint system is disclosed. The robotic lifting and orienting system includes: a base coupled to wheels; and an automated carrier coupled to the base. The automated carrier includes: a fixture assembly configured to hold an object to be painted; one or more manipulators configured to move the fixture assembly relative to a paint robot; a propulsion system connected to the wheels and configured to move the robotic lifting and orienting system; and a control module configured to control the one or more manipulators and the propulsion system to control positioning and orienting of the object relative to at least one of the paint robot and an overspray-free paint applicator of the paint robot.

In other features, the automated carrier has six degrees-of-freedom movement of the fixture assembly.

In other features, each of the one or more manipulators includes: couplers connected to the fixture assembly and a body of the automated carrier; linkages connected to the couplers; and one or more actuators configured to move the linkages from stowed to partially or fully deployed states.

In other features, the one or more manipulators includes manipulators configured to adjust roll and pitch of the fixture assembly and the object such that surfaces of the object to be painted are horizontal and perpendicular to the overspray-free paint applicator when painted.

In other features, the fixture assembly includes: a fixture base connected to the one or more manipulators; and a fixture configured to hold the object and mounted on the fixture base.

In other features, at least one of the robotic lifting and orienting system and the automated carrier is configured to move independently relative to the paint robot.

In other features, a body of the automated carrier is weighted to counterbalance weight of the fixture assembly and the object.

In other features, the base is weighted to counterbalance weight of the fixture assembly and the object.

In other features, the base includes one or more weights to counterbalance weight of the fixture assembly and the object.

In other features, the base includes: at least one rail along which the one or more weights are moved; and at least one actuator configured to move the one or more weights along the at least one rail. The control module is configured to control operation of the at least one actuator to move the one or more weights based on movement of the object.

In other features, the object is at least one of a vehicle component and a body-in-white. The automated carrier is configured to move the at least one of the vehicle component and the body-in-white in X, Y, Z directions relative to the paint robot and adjust roll and pitch of the at least one of the vehicle component and the body-in-white relative to a body of the automated carrier.

In other features, an overspray-free paint system is disclosed and includes: the robotic lifting and orienting system of claim 1; and the paint robot.

In other features, the overspray-free paint system further includes a central monitoring station configured to at least one of monitor and control operation of the robotic lifting and orienting system and the paint robot.

In other features, an overspray-free paint system is disclosed and includes: a paint robot including a first base, an overspray-free paint applicator, arms extending from the first base to the overspray-free paint applicator, motors connected to the arms, and a first control module configured to control the motors to move and orient the overspray-free paint applicator; and a robotic lifting and orienting system including an automated carrier. The automated carrier includes: a fixture assembly configured to hold an object to be painted; one or more manipulators configured to move the fixture assembly relative to the paint robot; a propulsion system configured to move the robotic lifting and orienting system; and a second control module configured to control the one or more manipulators and the propulsion system to control positioning and orienting of the object relative to at least one of the paint robot and the overspray-free paint applicator.

In other features, the first control module is configured to control the motors to provide six degrees-of-freedom movement of the overspray-free paint applicator. The robotic lifting and orienting system and the automated carrier provide six degrees-of-freedom movement of the fixture assembly and the object.

In other features, the first control module and the second control module move the overspray-free paint applicator, the robotic lifting and orienting system, and the automated carrier independently and in a coordinated manner to facilitate overspray-free paint operation.

In other features, the robotic lifting and orienting system includes a second base coupled to wheels. The automated carrier is mounted on the second base.

In other features, the second base includes one or more weights to counterbalance weight of the fixture assembly and the object.

In other features, the second base includes: at least one rail along which the one or more weights are moved; and at least one actuator configured to move the one or more weights along the at least one rail. The second control module is configured to control operation of the at least one actuator to move the one or more weights based on movement of the object.

In other features, the object is a vehicle component. The automated carrier is configured to move the vehicle component in X, Y, Z directions relative to the paint robot and adjust roll and pitch of the vehicle component relative to a body of the automated carrier.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is a top view of an automated carrier having three manipulators arranged near left and rights sides of the automated carrier in accordance with the present disclosure;

FIG. 10 is a top view of an automated carrier having three manipulators arranged near front and rear sides of the automated carrier in accordance with the present disclosure;

FIG. 11 is a top view of an automated carrier having four manipulators arranged near left and rights sides of the automated carrier in accordance with the present disclosure;

In the drawings, reference numbers may be reused to identify similar and/or identical elements.

DETAILED DESCRIPTION

Figure 1:
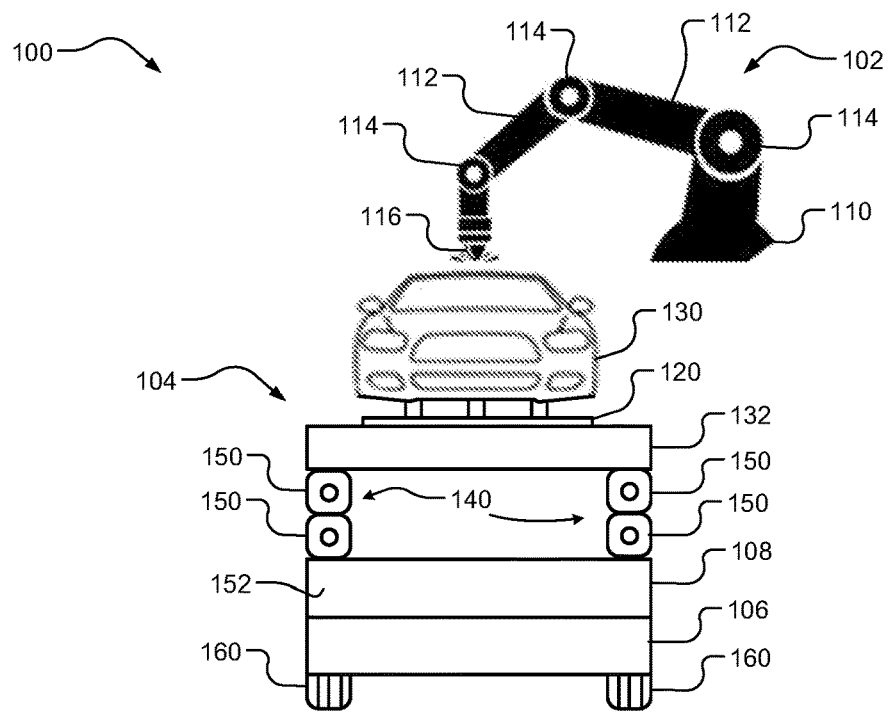
FIG. 1 is a front view of an example of an overspray-free paint system including a paint robot and a robotic lifting and orienting system including an automated carrier in a stowed state to paint a top surface of a vehicle in accordance with the present disclosure.

An overspray-free paint system may include a carrier on which a vehicle BIW is mounted and a paint robot with an overspray-free paint applicator. The paint robot includes a paint applicator that is highly efficient and exhibits minimal to no overspray (e.g., less than 10% emissions as compared to traditional paint sprayers). The overspray-free paint system however can have two limitations. As a first example, an overspray-free system may have a carrier that is implemented as a conveyor or as an automated guided vehicle (AGV), which only carries and moves the vehicle BIW in and out of a paint booth. As another example, the overspray-free paint applicator is best suited for downward spraying in the direction of gravity. Hence the overspray-free paint system is limited to decorative painting applications to, for example, vehicle roofs, hoods and trunk lids, instead of entire vehicle BIW surfaces and/or other vehicle surfaces.

The examples set forth herein include overspray-free paint systems that are not limited to particular vehicle components and/or painting surfaces. The overspray-free paint systems disclosed herein include robotic lifting and orienting systems. The robot lifting and orienting systems include automated carriers. The automated carriers may be implemented as an AGV or an autonomous mobile robot (AMR). The automated carriers include integrated robotic manipulators are able to provide various movements synchronized with movements of paint robots having overspray-free paint applicators. This facilitates horizontal or near horizontal positioning of various surfaces of a vehicle for painting. The disclosed systems provided improved access angles to targeted surfaces including holes, recess edges, side panels, roofs, door panels, corner panels, fenders, hods, trunk lids, rear ends, front ends, etc. These surfaces are painted while being in horizontal or near horizontal painting positions. The overspray-free paint systems enable use of high transfer efficiency overspray-free paint applicators for surfaces of entire vehicle bodies and body components and/or panels. Although the following examples are described with respect to a vehicle and a vehicle BIW, the examples are applicable to body panels, other vehicle components, and/or other objects being painted.

FIGS. 1-4 show an overspray-free paint system 100 including a paint robot 102 and robotic lifting and orienting system 104 with a counterbalance base 106 and an automated carrier 108. The paint robot 102 includes a base 110, robot arms 112, motors 114 and an overspray-free paint applicator 116. In FIGS. 1-4, not all of the motors 114 are shown. The base 110 is in a fixed position, for example, mounted to a floor of a building. The paint applicator 116 is able to be moved in X, Y, and Z directions relative to the base 110 and rotated about X, Y, and Z axes providing 6-degrees-of-freedom movement of the paint applicator 116.

The robotic lifting and orienting system 104 moves relative to the paint robot 102. The robotic lifting and orienting system 104 is a lifting, positioning and orienting system that is able to move in X and Y directions relative to the base 110 of the paint robot 102. The automated carrier 108 may be implemented as an AGV or an AMR. An AGV may have a predefined route, which may follow, for example, a magnetic strip located on or embedded in a floor on which the robotic lifting and orienting system 104 is moving. An AMR may not have a predefined route and may be able to travel in any direction.

The automated carrier 108 is configured to move a fixture 120 in X, Y and Z directions and to change roll and pitch of the fixture 120. The X direction refers to movement of the robotic lifting and orienting system 104 and/or the fixture 120 in forward and rearward directions. The X direction may refer to the forward (or front) and rearward (or back)

direction relative to the object being painted, which may be the same direction relative to the robotic lifting and orienting system 104 and/or the fixture 120. The Y direction refers to movement of the robotic lifting and orienting system 104 and/or the fixture 120 in left and right directions, which may also be relative to the object being painted. The Z direction refers to movement of the fixture 120 in up and down directions. The roll being about the X axis and the pitch being about the Y axis. The robotic lifting and orienting system 104 is able to rotate about the Z-axis to adjust yaw of the fixture 120. The fixture 120 may be referred to as an underbody fixture.

Figure 2:
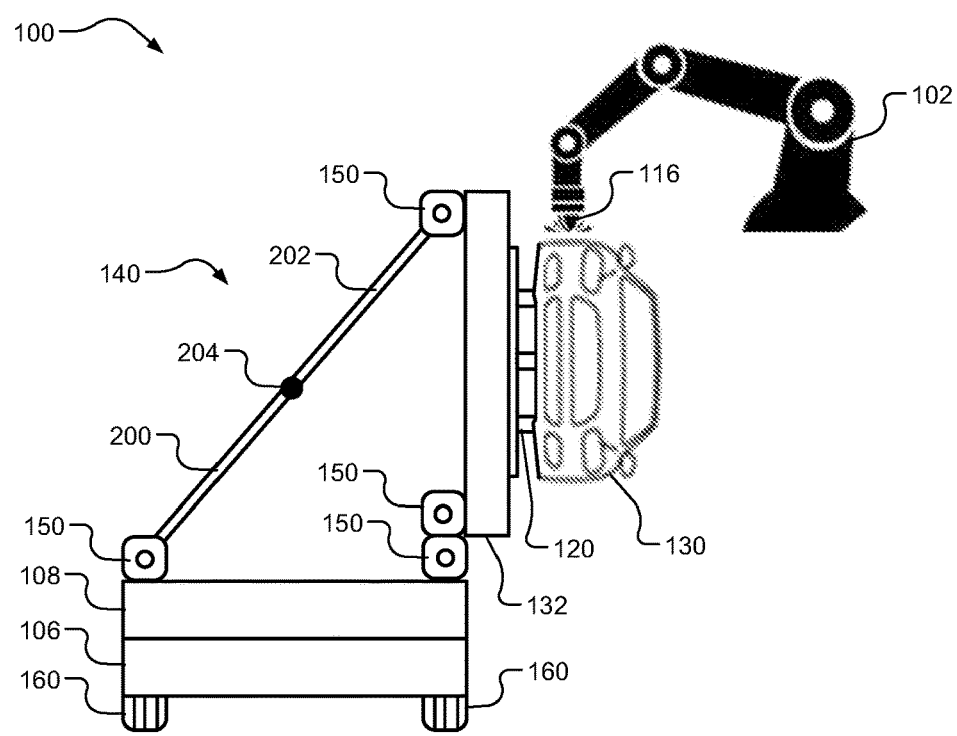
FIG. 2 is a front view of the overspray-free paint system of FIG. 1 with the automated carrier in a deployed vertical state to paint a side surface of the vehicle.
Figure 3:
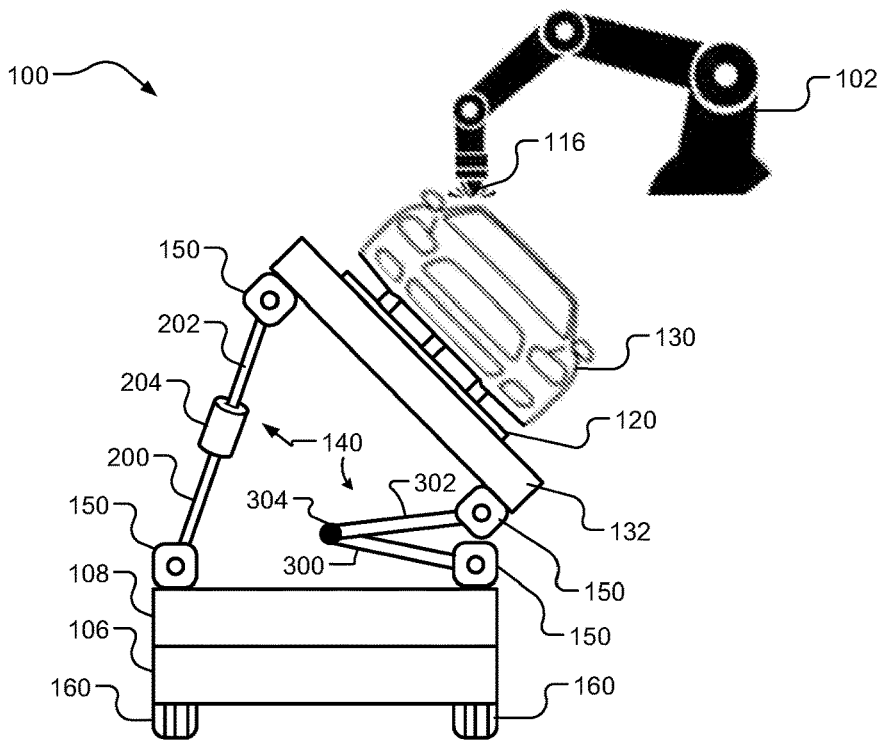
FIG. 3 is a front view of the overspray-free paint system of FIG. 1 with the automated carrier in a deployed roll state to paint a passenger side angled pillar of the vehicle.
Figure 4:
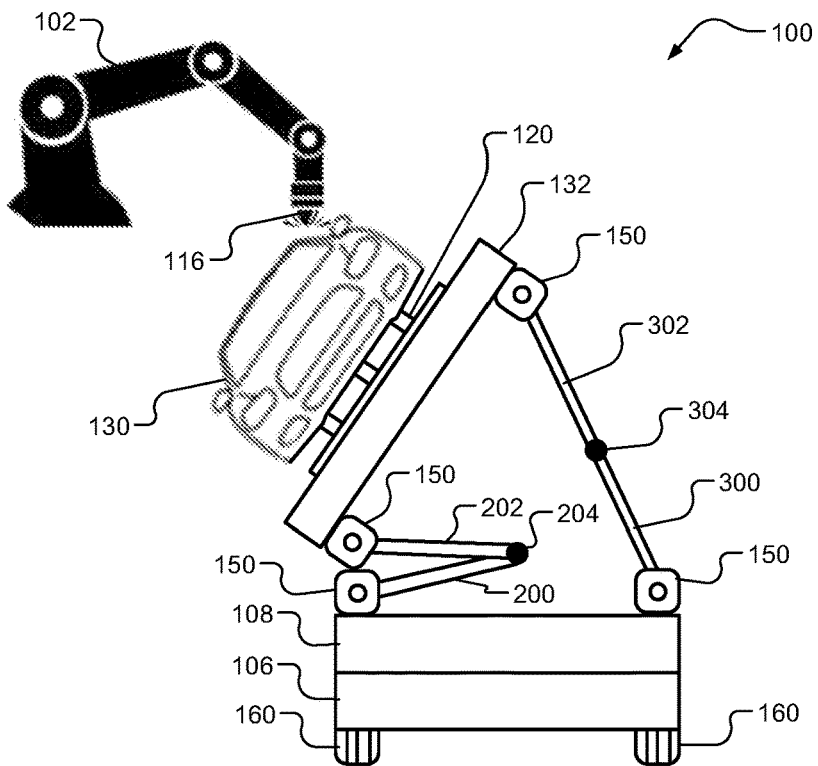
FIG. 4 is a front view of the overspray-free paint system of FIG. 1 with the automated carrier in a deployed roll state to paint a driver side angled pillar of the vehicle.

In FIG. 1, the automated carrier 108 is shown in a stowed state and the fixture 120 is positioned to paint a top surface of a vehicle 130. The automated carrier 108 may be referred to as a lifter. The top surface is in a horizontal or near horizontal state relative to, for example, the floor on which the paint robot 102 and the robotic lifting and orienting system 104 are located. FIG. 2 shows the automated carrier 108 in a deployed vertical state to paint a side surface of the vehicle 130. FIG. 3 shows the automated carrier 108 in a deployed roll state to paint a passenger side angled pillar of the vehicle 130. FIG. 4 shows the automated carrier 108 in a deployed roll state to paint a driver side angled pillar of the vehicle 130.

The fixture 120 is configured to hold the vehicle 130 relative to a fixture base 132. The fixture 120 and the fixture base 132 are part of a fixture assembly that is configured to hold an object, such as the vehicle 130, to be painted. The fixture base 132 is attached to the automated carrier 108 via manipulators 140 of the automated carrier 108. The manipulators 140 may include motors, linkages, linear actuators, rotary actuators, etc. The manipulators 140 may be electrically, hydraulically and/or pneumatically driven. In the example of FIGS. 1-4, each of the manipulators 140 includes couplers, linkages, and one or more actuators. The actuators may be linear or rotary motors with corresponding gears and/or couplers to move the linkages between fully stowed to partially and/or fully deployed states. In FIG. 1, couplers 150 for attaching two manipulators to the fixture base and the automated carrier 108 are shown. The corresponding linkages and actuators are not shown in FIG. 1. Each of the manipulators 140 may have one or more linkages and one or more actuators. Examples of linkages and actuators are shown in FIGS. 2-4. The automated carrier 108 may have one or more manipulators. To provide the described movement of the fixture 120, the automated carrier 108 has at least three manipulators. The automated carrier 108, via the manipulators 140, i) moves the fixture 120 and the vehicle 130 relative to a body 152 of the automated carrier 108 in the X, Y, Z directions, and ii) adjusts roll and pitch the fixture 120 and the vehicle 130. The movement of the robotic lifting and orienting system 104 and the fixture 120 provides 6 degrees-of-freedom movement of the fixture 120 and vehicle 130.

Figure 12:
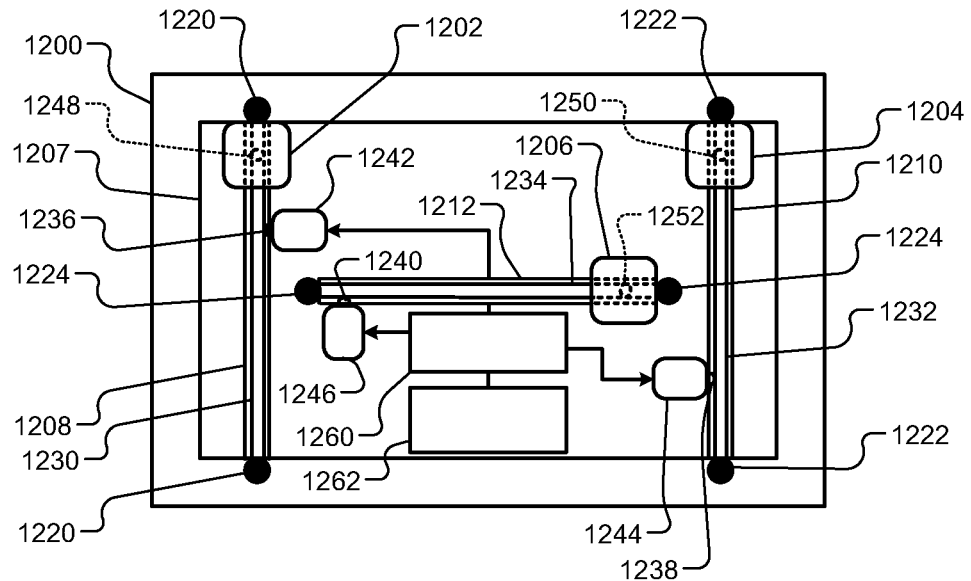
FIG. 12 is a top view of a counterbalance base in accordance with the present disclosure.
Figure 13:
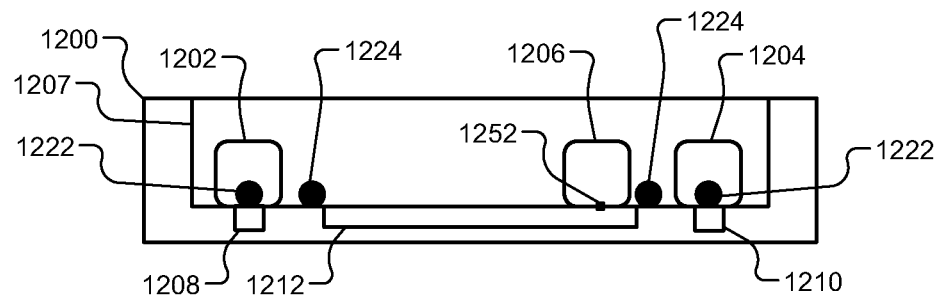
FIG. 13 is a side view of a portion of the counterbalance base of FIG. 12.

The counterbalance base 106 may include counterbalance weights, examples of which are shown in FIGS. 12-13. The counterbalance weights are moved based on positions of the fixture 120 and the weight, size and center of gravity of the object attached to the fixture 120. The counterbalance weights are moved to compensate for weight shifting due to movement of the object to paint different surfaces of the object. The counterbalance base 106 may include wheels 160. In an embodiment, the counterbalance base 106 is not included and the automated carrier 108 includes the wheels 160. In another embodiment, the counterbalance base 106 is included and does not include moving counterbalance weights, but rather is heavily weighted to not tip due to movement of the fixture 120. In another embodiment, the counterbalance base 106 is not included and the automated carrier 108 is heavily weighted to not tip due to movement of the fixture 120.

In FIGS. 2-4, linkages 200, 202, and an actuator 204 are shown for one of the manipulators 140. In FIGS. 3-4, linkages 300, 302, and an actuator 304 are shown for another one of the manipulators 140. The linkages 300, 302, and an actuator 304 are not shown in FIG. 2 but may be included. Although an example arrangement of manipulators having certain linkages and actuators are shown in FIGS. 1-4, other arrangements may be implemented including different types of linkages, couplers and/or actuators than shown in FIGS. 1-4.

The number and characteristics of manipulators, actuators, links, joints, motors (e.g., servo motors), etc. incorporated in the automated carrier 108 may be set based on the size, weight and/or center of gravity of the objects being painted. The characteristics may include load capacity, materials, sizes, power ratings, voltage ratings, current ratings, pressures, etc.

FIGS. 5-8 show the overspray-free paint system 100 including the paint robot 102 and the robotic lifting and orienting system 104. The paint robot 102 includes the paint applicator 116. The robotic lifting and orienting system 104 may include the counterbalance base 106, the automated carrier 108, the fixture base 132, and the fixture 120. As an example, a BIW 500 may be mounted on the fixture 120. The fixture base 132 may be connected to the automated carrier 108 via manipulators 501 having couplers 502, linkages 504 and actuators 506. The manipulators 501 may be included in addition to the manipulators 140 of FIGS. 1-4.

Figure 5:
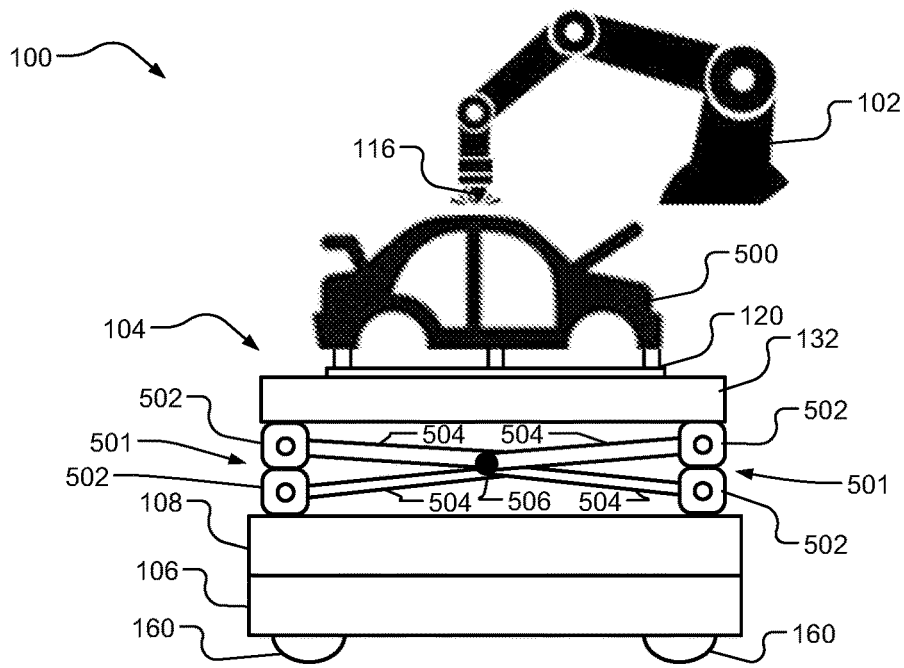
FIG. 5 is a side view of the overspray-free paint system of FIG. 1 with the automated carrier in a stowed state to paint a top surface of a vehicle BIW.
Figure 6:
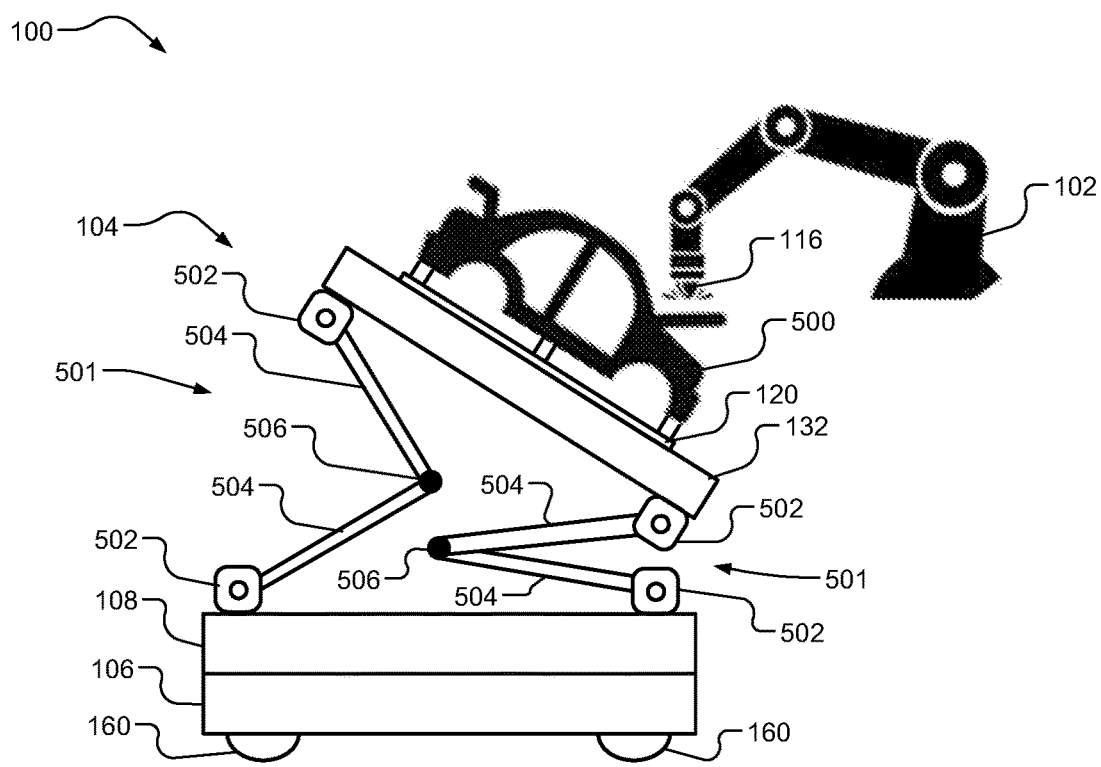
FIG. 6 is a side view of the overspray-free paint system of FIG. 1 with the automated carrier in a deployed pitch rotation state to paint a hood of the vehicle BIW.
Figure 7:
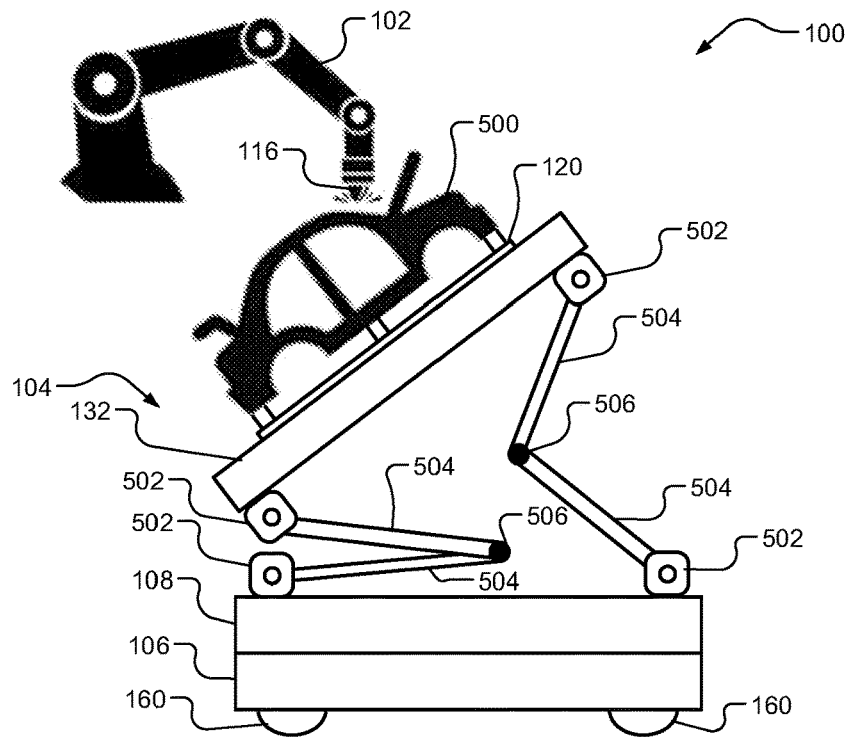
FIG. 7 is a side view of the overspray-free paint system of FIG. 1 with the automated carrier in another deployed pitch rotation state to paint an angled pillar of the vehicle BIW.
Figure 8:
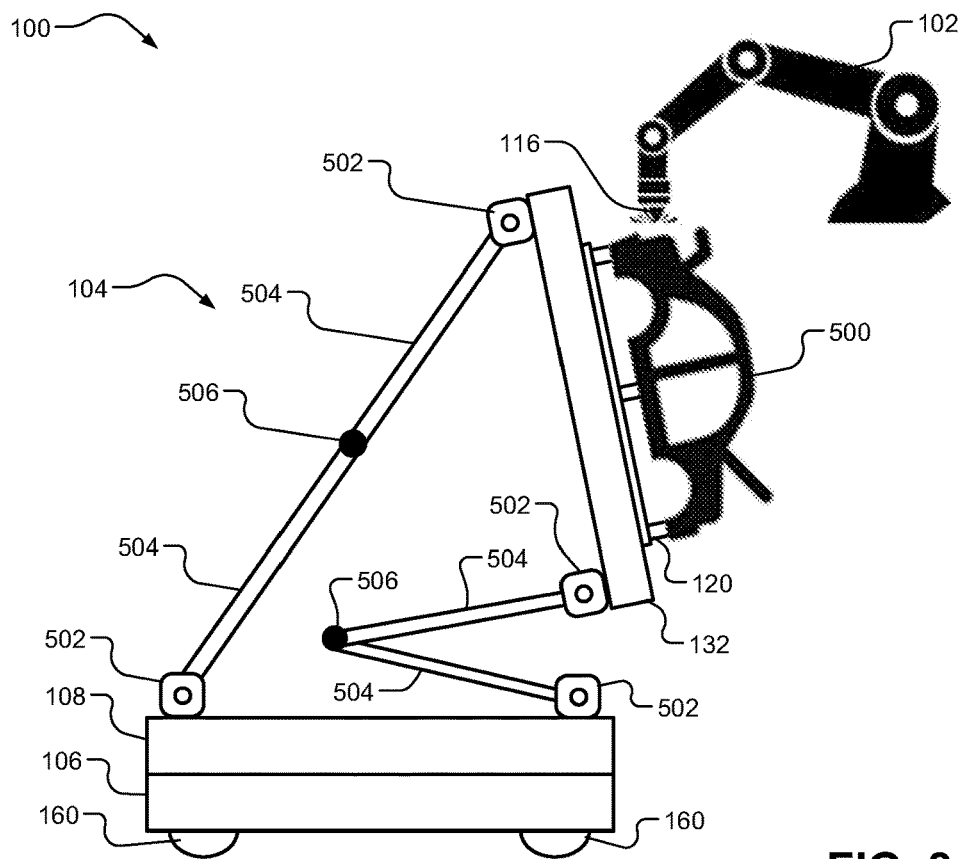
FIG. 8 is a side view of the overspray-free paint system of FIG. 1 with the automated carrier in a deployed pitched near vertical state to paint a rear end of the vehicle BIW.

In FIGS. 1 and 5, the fixture base 132 is shown in a horizontal position. In FIG. 2, the fixture base 132 is shown in a vertical position. In FIG. 3, the fixture base 132 is shown in a rolled right position. In FIG. 4, the fixture base 132 is shown in a rolled left position. In FIG. 6, the fixture base 132 is shown in a pitch forward rotated position. In FIG. 7, the fixture base 132 is shown in a pitch rearward rotated position. In FIG. 8, the fixture base 132 is shown in a near vertical pitch forward rotated position.

The robotic lifting and orienting system 104 and automated carrier 108 are able to collectively move an object to be painted in various orientations relative to a paint robot. This allows the entire object to be painted via a single paint robot at a single location (or paint booth). As an example, the robotic lifting and orienting system 104 and automated carrier 108 allow for a whole vehicle and/or BIW to be painted with a single overspray-free paint robot. The robotic lifting and orienting system 104 is able to move an object to be painted without use of a conveyor.

The robotic lifting and orienting system 104 and automated carrier 108 may move and orient the object relative to the paint robot 102 and then hold in a static position while the paint applicator 116 is moved relative to the object. The paint applicator 116 may be dynamically moved along the curvature of a surface of the object while, for example, maintaining an equal distance from the surface. The robotic lifting and orienting system 104 and automated carrier 108 are also able to move and orient the object relative to the paint robot 102 dynamically such that the area being painted remains perpendicular to the direction of the gravitational field. The paint robot 102 and the automated carrier 108 are configured to maintain a perpendicular relationship between a direction of paint flow out of the overspray-free paint applicator and a surface of the object being painted. The automated carrier 108 is configured to maintain a perpendicular relationship between a direction of the gravitational field at the fixture assembly and a surface of the object being painted.

The orientation and/or position of the paint applicator 116 may be maintained in a fixed state or adjusted in a synchronized manner with movement of the object by the robotic lifting and orienting system 104 and automated carrier 108. The robotic lifting and orienting system 104 and automated carrier 108 may collectively be referred to as a carrier that is an omnidirectional-drive system providing 6-degrees-of-freedom movement. The robotic lifting and orienting system 104 provides three degrees-of-freedom movement. The automated carrier 108 provides three degrees-of-freedom movement including movement in the Z direction, rotation about the X-axis of the robotic lifting and orienting system 104, and pitch about the Y-axis of the robotic lifting and orienting system 104. The rotation about the X-axis also moves the object being painted in the Y direction. The pitch about the Y-axis also moves the object being painted in the X-direction.

In FIGS. 2-8, the automated carrier 108 orients the object being painted such that the surface being painted is in a horizontal or near horizontal orientation. This is done such that the overspray-free paint applicator 116 is in a vertical orientation to maintain maximum accuracy in paint application. The overspray-free paint applicator 116 is in a vertical arrangement directing paint in a vertically downward direction. The robotic lifting and orienting system 104 and automated carrier 108 are able to move fixtures and objects to be painted into various orientations allowing for various surfaces of an object to be painted by the single paint robot 102. The robotic lifting and orienting system 104 and automated carrier 108 may be used to paint all surfaces of an object via the paint robot 102.

FIG. 9 shows an automated carrier 900 having three manipulators 902, 904, 906 arranged near left and rights sides 908, 910 of the automated carrier 900. FIG. 10 shows an automated carrier 1000 having three manipulators 1002, 1004, 1006 arranged near front and rear sides 1008, 1010 of the automated carrier 1000. FIG. 11 shows an automated carrier 1100 having four manipulators 1102, 1104, 1106, 1108 arranged near left and rights sides 1110, 1112 of the automated carriers 1100. The automated carriers of FIGS. 9-11 may be implemented as AGVs or AMRs. The manipulators of FIGS. 9-11 are represented as boxes, which may refer to the couplers of the manipulators coupling the manipulators to a fixture base and an automated carrier. The manipulators of FIGS. 9-11 are shown without linkages and actuators, although they may be included. The manipulators that are on opposite sides of an automated carrier may be offset from each other to prevent interference between linkages and/or actuators of different manipulators. As an example, the manipulators 1102, 1104 of FIG. 11 are offset in the X direction (or front to back) relative to the manipulators 1106, 1108.

FIGS. 12-13 show an example of a counterbalance base 1200, which may replace the counterbalance base 106 of FIGS. 1-8. The side view of FIG. 13 shows only a portion of the counterbalance base 1200. The counterbalance base 1200 may include counterbalance weights 1202, 1204, 1206 located in a cavity 1207. Although three counterbalance weights are shown, the counterbalance base 1200 may include one or more counterbalance weights. The counterbalance weights 1202, 1204, 1206 may be moved along respective rails 1208, 1210, 1212. In the example shown, the rails 1208, 1210 extend laterally (left to right) across the counterbalance base 1200. The rail 1212 extends front to back (or perpendicular to the rails 1208, 1210. Other arrangements may be implemented. The arrangement shown allows a fixture and/or object to be painted to be rolled left or right and pitched forward or rearward without tipping the corresponding robotic lifting and orienting system. One or more of the counterbalance weights 1202, 1204, 1206 are moved in an X and/or Y direction that is opposite the X or Y movement of the fixture and object. For example, when the fixture and object are moved to one side of the corresponding robotic lifting and orienting system, one or more of the counterbalance weights 1202, 1204, 1206 are moved to the opposite side of the robotic lifting and orienting system and/or opposite side of the counterbalance base 1200 to stabilize the robotic lifting and orienting system.

The rails 1208, 1210, 1212 may have stoppers 1220, 1222, 1224 that limit movement of the counterbalance weights 1202, 1204, 1206. The rails 1208, 1210, 1212 may have linear gears 1230, 1232, 1234 that engage with circular gears 1236, 1238, 1240 on motors 1242, 1244, 1246 and with circular gears 1248, 1250, 1252 on the counterbalance weights 1202, 1204, 1206.

The motors 1242, 1244, 1246 are controlled by a control module 1260, which receives power from a power source 1262. The control module 1260 may be the control module of the corresponding robotic lifting and orienting system or may be a separate control module for the counterbalance base 1200. The control module 1260 moves the counterbalance weights based on movement of the fixture and object being painted. The power source 1262 may include, for example, one or more battery packs.

Figure 14:
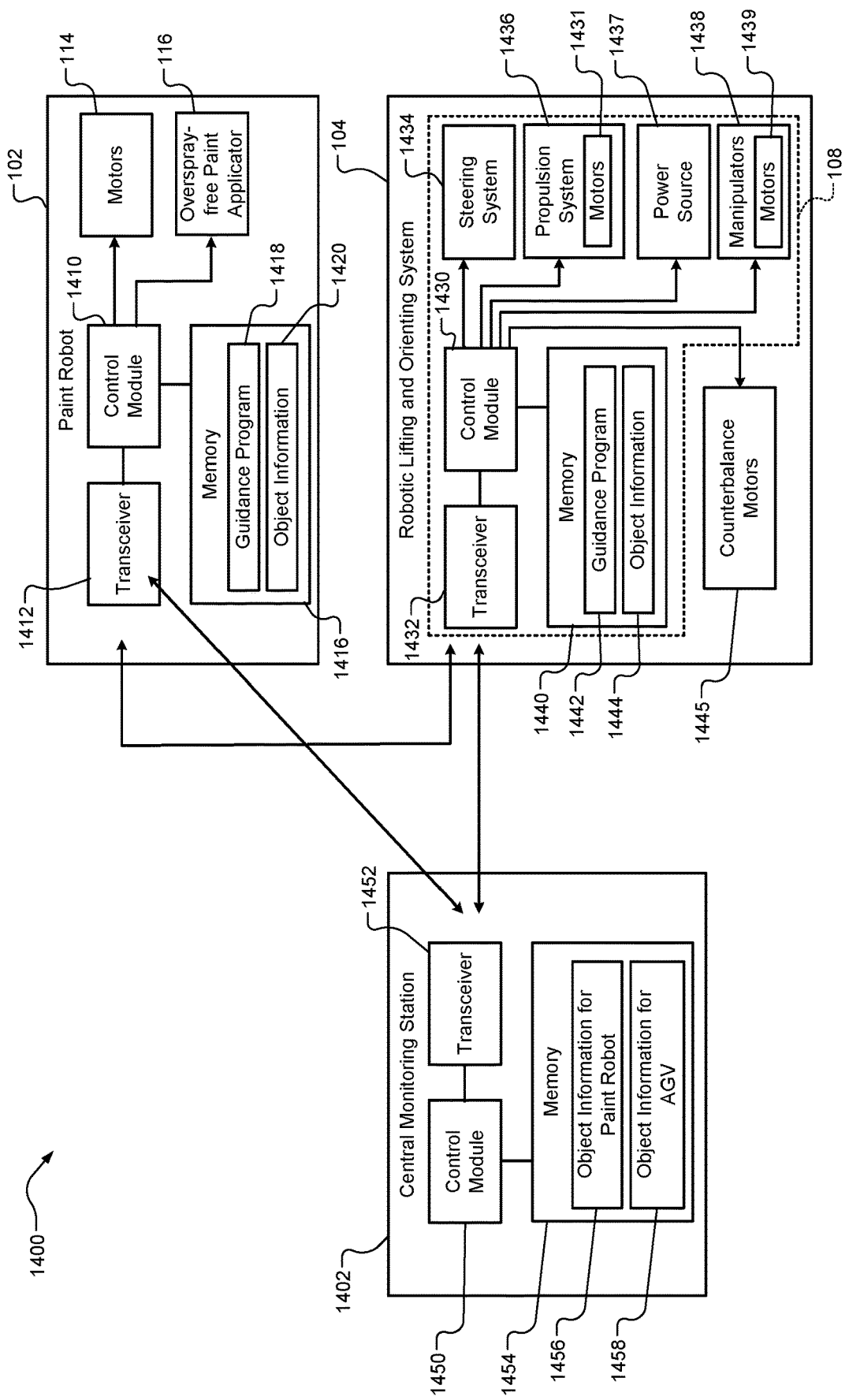
FIG. 14 is a functional block diagram of another overspray-free paint system in accordance with the present disclosure.

FIG. 14 shows an overspray-free paint system 1400, which may include the overspray-free paint system 100 of FIG. 1 includes the paint robot 102, the robotic lifting and orienting system 104, and may include a central monitoring station 1402. The paint robot 102 may include a control module 1410, a transceiver 1412, and memory 1416. The memory 1416 may store a guidance program 1418 and object information 1420. The guidance program 1418 may be implemented to control the motors 114 and movement of the overspray-free paint applicator 116. This may be based on the object information 1420, such as object location, size, orientation, surface dimensions, etc.

The robotic lifting and orienting system 104 may include a control module 1430, a transceiver 1432, a steering system 1434, a propulsion system 1436, a power source 1437, manipulators 1438 (e.g., any of the manipulators referred to herein), and a memory 1440. The memory 1440 may store a guidance program 1442 and object information 1444. The control module 1430 controls movement of the robotic lifting and orienting system 104 and may control movements of counterbalance weights of a counterbalance base, as disclosed herein via counterbalance motors 1445, such as the counterbalance motors 1242, 1244, 1246 of FIG. 12. The control module 1430 controls heading and speed of the robotic lifting and orienting system 104 via the systems 1434, 1436.

The propulsion system 1436 may include one or more motors 1431 powered by the power source 1437, which may include one or more battery packs. The propulsion system 1436, in additional to the motors 1431 may include wheels, one or more axles, a driveshaft, etc. The guidance program 1442 may be implemented to control the systems 1434, 1436 to control speed and movement of the robotic lifting and orienting system 104 relative to the paint robot 102 and/or the overspray-free paint applicator 116. This may be based on the object information 1444, such as object location, size, orientation, surfaces to be painted, dimensions of the surfaces, etc. The object information 1444 may also include object weight, center of gravity, etc., which may be used to control positioning of counterbalance weights.

The central monitoring station 1402 may include a control module 1450, a transceiver 1452, and a memory 1454. The memory 1454 may store object information 1456 for the paint robot 102 and object information 1458 for the robotic lifting and orienting system 104. The object information 1456 may include the object information 1420. The object information 1458 may include the object information 1444. The central monitoring station 1402 may monitor and/or remotely control operations of the paint robot 102 and/or the robotic lifting and orienting system 104. This may include monitoring and/or controlling activation, deactivation, guidance program initiation, paint start and stop times, movements of the paint applicator 116, movement of the robotic lifting and orienting system 104, movement of manipulators 1438 of the robotic lifting and orienting system 104, operation of motors 1439 of the manipulators 1438, etc.

The control modules 1410, 1430 and 1450 may be in communication with each other and/or operate independently. The control modules 1410, 1430 move the overspray-free paint applicator 116, the robotic lifting and orienting system 104, and the automated carrier 108 independently and in a coordinated manner to facilitate overspray-free paint operation. The control modules 1410, 1430 may be synchronized and/or perform operations based on a provided start time and/or a global clock signal. The global clock signal may be shared with the control modules 1410, 1430, 1450. The control module 1450 may provide the global clock signal and/or a timing signal to the control modules 1410, 1430 to synchronize the control modules 1410, 1430. The control modules 1410, 1430 move the paint applicator 116 and the fixture 120 in a synchronized manner to prevent the paint applicator 116 from coming in contact with an object being painted and control the location of the paint applicator 116 relative to a surface of the object.

Figure 15:
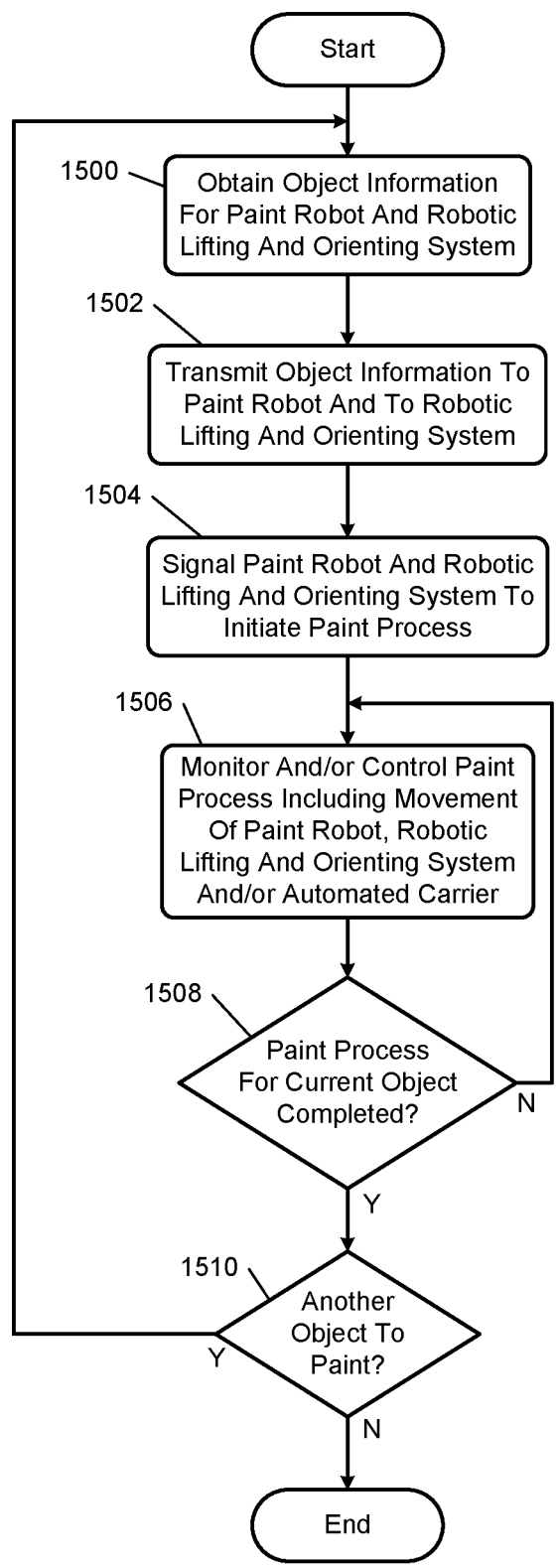
FIG. 15 illustrates a method of operating a central monitoring station of the overspray-free paint system of FIG. 14 in accordance with the present disclosure.

FIG. 15 shows a method of operating the central monitoring station 1402 of the overspray-free paint system 1400 of FIG. 14. The following operations may be iteratively performed. At 1500, the control module 1450 may obtain object information, such as vehicle and/or BIW information for the paint robot 102 and the robotic lifting and orienting system 104. The object information may include any of the above-stated object information. At 1502, the control module 1450 may transmit via the transceiver 1452 the object information to the paint robot 102 and the robotic lifting and orienting system 104.

At 1504, the control module 1450 may signal the paint robot 102 and the robotic lifting and orienting system 104 to initiate the paint process. The paint robot 102 and the robotic lifting and orienting system 104 may then position the paint applicator 116 and the object being painted to start positions and orientations. At 1506, the control module 1450 may monitor and/or control the painting process including movement of the paint robot 102, the robotic lifting and orienting system 104 and/or the automated carrier 108 via communication with the paint robot 102, the robotic lifting and orienting system 104 and/or the automated carrier 108. The paint robot 102, the robotic lifting and orienting system 104 and the automated carrier 108 may then autonomously move the paint applicator 116 and, for example, the fixture 120 of FIG. 1 to paint surfaces of the object or this may be controlled by the central monitoring station 1402.

At 1508, the control module 1450 may determine whether the paint process is completed for the current object being painted. If yes, operation 1510 may be performed, otherwise operation 1506 may be performed. At 1510, the control module 1450 may determine whether there is another object to be painted. If yes, this method may be repeated for the next object, otherwise the method may end.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 16:
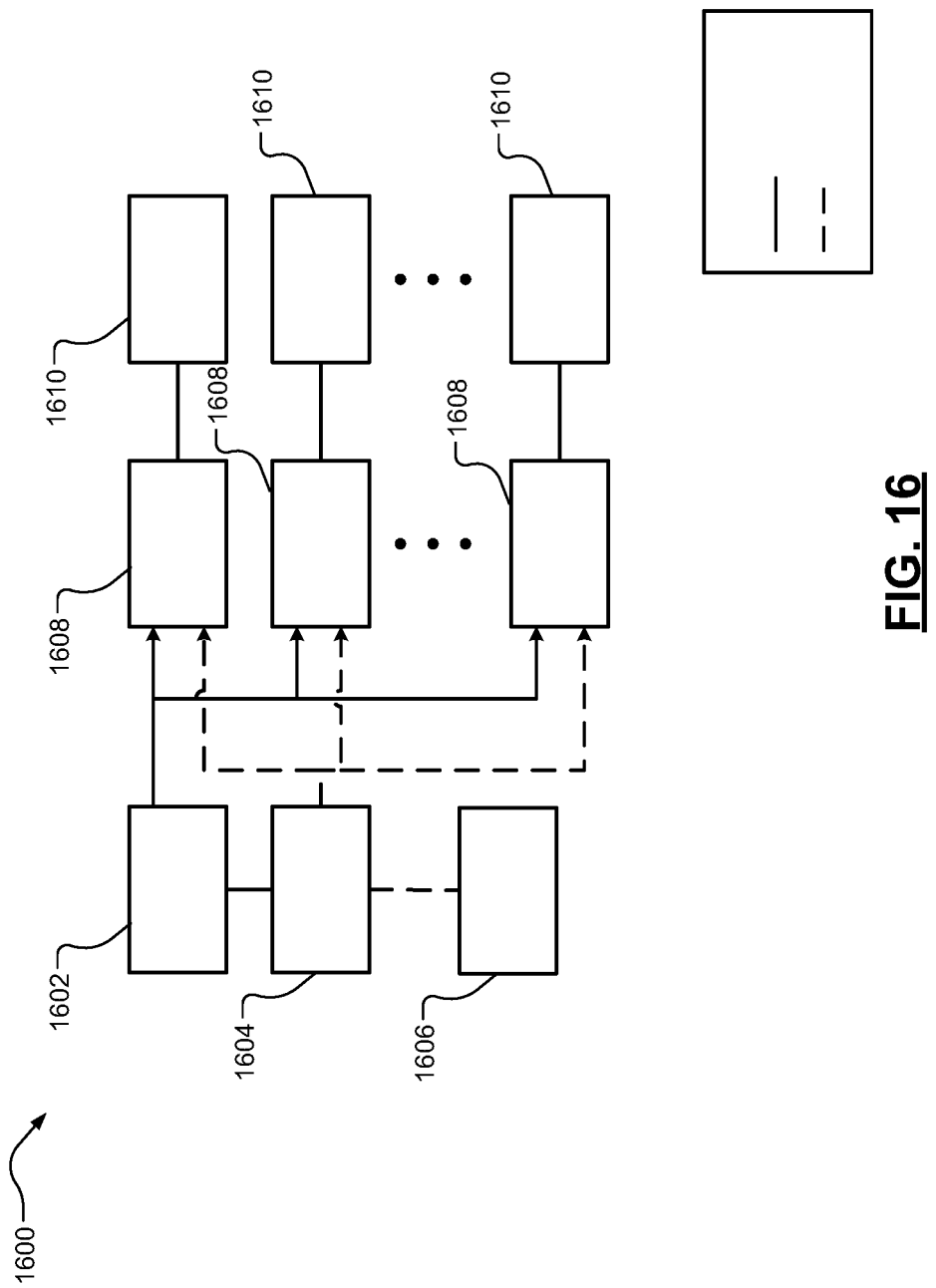
FIG. 16 is a functional block diagram of a fluidically actuated manipulator system in accordance with the present disclosure.

FIG. 16 shows a fluidically actuated manipulator system 1600. This system may be used to, for example, move a fixture, such as the fixture 120 of FIG. 1. The fluidically actuated manipulator system 1600 may be used instead of an electrical system as shown and described with respect to FIG. 14. The fluidically actuated manipulator system 1600 may include a control module 1602, a pump 1604, a reservoir 1606, valves 1608, and actuators 1610. The actuators may be hydraulic or pneumatic actuators. The pump 1604 may pump and/or control pressure of gas or liquid to and from the valves 1608. The fluid may be stored in the reservoir 1606. Although a single valve is shown for each of the actuators 1610, multiple valves may be included. The control module 1602 controls operation of the valves to control flow of fluid to and from the actuators 1610. The actuators 1610 may be used to transition corresponding manipulators including linkages between stowed and partially or fully deployed states.

The above-described examples provide a key enabler for, as an example, a micro/mini-factory designed for low volume vehicle production without traditional paint shop infrastructure. The examples enable a sustainable coating process that may not have a sludge tank and reduced emissions. The corresponding paint booth may include a ventilation system that has a small air flow rate and air volume transfer rate as compared to a traditional paint booth due to the reduced amount of paint emission involved. The examples enable use of overspray-free painting technologies to be used for entire vehicle body paint operations with increased horizontal or near-horizontal surface orientations and improved access angles to areas such as holes and recess edges.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, and/or devices, these elements, components, and/or devices should not be limited by these terms, unless otherwise indicated. These terms may be only used to distinguish one element, component, or device from another element, component, or device. Terms such as "first," "second," and other numerical terms when used herein do not imply a sequence or order unless clearly indicated by the context. Thus, a first element, component, or device could be termed a second element, component, or device without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic lifting and orienting system for an overspray-free paint system, the robotic lifting and orienting system comprising:
a base coupled to a plurality of wheels;

an automated carrier coupled to the base, the automated carrier comprising
  a fixture assembly configured to hold an object to be painted,
  one or more manipulators configured to move the fixture assembly relative to a paint robot, and
  a propulsion system connected to the plurality of wheels and configured to move the robotic lifting and orienting system,
at least one control module configured to i) control the one or more manipulators and the propulsion system to control positioning and orienting of the object relative to at least one of the paint robot and an overspray-free paint applicator of the paint robot, ii) control movement of the at least one of the paint robot and the overspray-free paint applicator, and iii) control movement of the object synchronized with movement of at least one of the paint robot and the overspray-free paint applicator; and
a steering system,
wherein the at least one control module is configured to control the steering system to steer the plurality of wheels when moving the object relative to the at least one of the paint robot and the overspray-free paint applicator.

2. The robotic lifting and orienting system of claim 1, wherein the automated carrier has six degrees-of-freedom movement of the fixture assembly.

3. The robotic lifting and orienting system of claim 1, wherein each of the one or more manipulators comprises:
  a plurality of couplers connected to the fixture assembly and a body of the automated carrier;
  a plurality of linkages connected to the plurality of couplers; and
  one or more actuators configured to move the plurality of linkages from stowed to partially or fully deployed states.

4. The robotic lifting and orienting system of claim 1, wherein the one or more manipulators comprises a plurality of manipulators configured to adjust roll and pitch of the fixture assembly and the object such that surfaces of the object to be painted are horizontal and perpendicular to the overspray-free paint applicator when painted.

5. The robotic lifting and orienting system of claim 1, wherein the fixture assembly comprises:
  a fixture base connected to the one or more manipulators; and
  a fixture configured to hold the object and mounted on the fixture base.

6. The robotic lifting and orienting system of claim 1, wherein at least one of the robotic lifting and orienting system and the automated carrier is configured to move independently relative to the paint robot.

7. The robotic lifting and orienting system of claim 1, wherein the base is weighted to counterbalance weight of the fixture assembly and the object.

8. The robotic lifting and orienting system of claim 1, wherein:
  the object is at least one of a vehicle component and a body-in-white, and
  the automated carrier is configured to move the at least one of the vehicle component and the body-in-white in X, Y, Z directions relative to the paint robot and adjust roll and pitch of the at least one of the vehicle component and the body-in-white relative to a body of the automated carrier.

9. The robotic lifting and orienting system of claim 1, wherein the at least one control module is configured to determine a target location of the object relative to the at least one of the paint robot and the overspray-free paint applicator, and to control the propulsion system and the one or more manipulators to move the object to the target location relative to the at least one of the paint robot and the overspray-free paint applicator.

10. The robotic lifting and orienting system of claim 1, wherein the robotic lifting and orienting system is implemented as an autonomous mobile robot.

11. The robotic lifting and orienting system of claim 1, wherein the at least one control module is configured to control positioning and orienting of the object relative to at least one of the paint robot and the overspray-free paint applicator prior to and during painting of the object via the overspray-free paint applicator.

12. A robotic lifting and orienting system for an overspray-free paint system, the robotic lifting and orienting system comprising:
  a base coupled to a plurality of wheels;
  an automated carrier coupled to the base, the automated carrier comprising
    a fixture assembly configured to hold an object to be painted,
    one or more manipulators configured to move the fixture assembly relative to a paint robot, and
    a propulsion system connected to the plurality of wheels and configured to move the robotic lifting and orienting system, and
    a control module configured to control the one or more manipulators and the propulsion system to control positioning and orienting of the object relative to at least one of the paint robot and an overspray-free paint applicator of the paint robot; and
  a steering system,
  wherein
    the control module is configured to control the steering system to steer the plurality of wheels when moving the object relative to the at least one of the paint robot and the overspray-free paint applicator,
    the base comprises
      at least one rail along which one or more weights are moved, and
      at least one actuator configured to move the one or more weights along the at least one rail, and
    the control module is configured to control operation of the at least one actuator to move the one or more weights based on movement of the object.

13. An overspray-free paint system comprising:
  the robotic lifting and orienting system of claim 1; and
  the paint robot.

14. The overspray-free paint system of claim 13, further comprising a central monitoring station configured to at least one of monitor and control operation of the robotic lifting and orienting system and the paint robot.

15. An overspray-free paint system comprising:
  a paint robot comprising
    a first base,
    an overspray-free paint applicator,
    a plurality of arms extending from the first base to the overspray-free paint applicator,
    a plurality of motors connected to the plurality of arms, and
    a first control module configured to control the plurality of motors to move and orient the overspray-free paint applicator; and a robotic lifting and orienting system comprising an automated carrier, the automated carrier comprising
  a fixture assembly configured to hold an object to be painted,
  one or more manipulators configured to move the fixture assembly relative to the paint robot,
  a propulsion system configured to move the robotic lifting and orienting system, and
  a second control module configured to control the one or more manipulators and the propulsion system to control positioning and orienting of the object relative to at least one of the paint robot and the overspray-free paint applicator,
wherein the first control module and the second control module are configured to control movement of the object synchronized with movement of the overspray-free paint applicator.

16. The overspray-free paint system of claim 15, wherein:
the first control module is configured to control the plurality of motors to provide six degrees-of-freedom movement of the overspray-free paint applicator; and
the robotic lifting and orienting system and the automated carrier provide six degrees-of-freedom movement of the fixture assembly and the object.

17. The overspray-free paint system of claim 14, wherein:
the robotic lifting and orienting system comprises a second base coupled to a plurality of wheels;
the automated carrier is mounted on the second base;
the second base comprises one or more weights to counterbalance weight of the fixture assembly and the object;
the second base comprises
  at least one rail along which the one or more weights are moved, and
  at least one actuator configured to move the one or more weights along the at least one rail; and
the second control module is configured to control operation of the at least one actuator to move the one or more weights based on movement of the object.

18. The overspray-free paint system of claim 15, wherein:
the object is a vehicle component, and
the automated carrier is configured to move the vehicle component in X, Y, Z directions relative to the paint robot and adjust roll and pitch of the vehicle component relative to a body of the automated carrier.

* * * * *